E. P. KILCOYNE.
WEIGHING DEVICE FOR ELEVATORS.
APPLICATION FILED JULY 2, 1910.
1,003,913.
Patented Sept. 19, 1911.
3 SHEETS—SHEET 1.
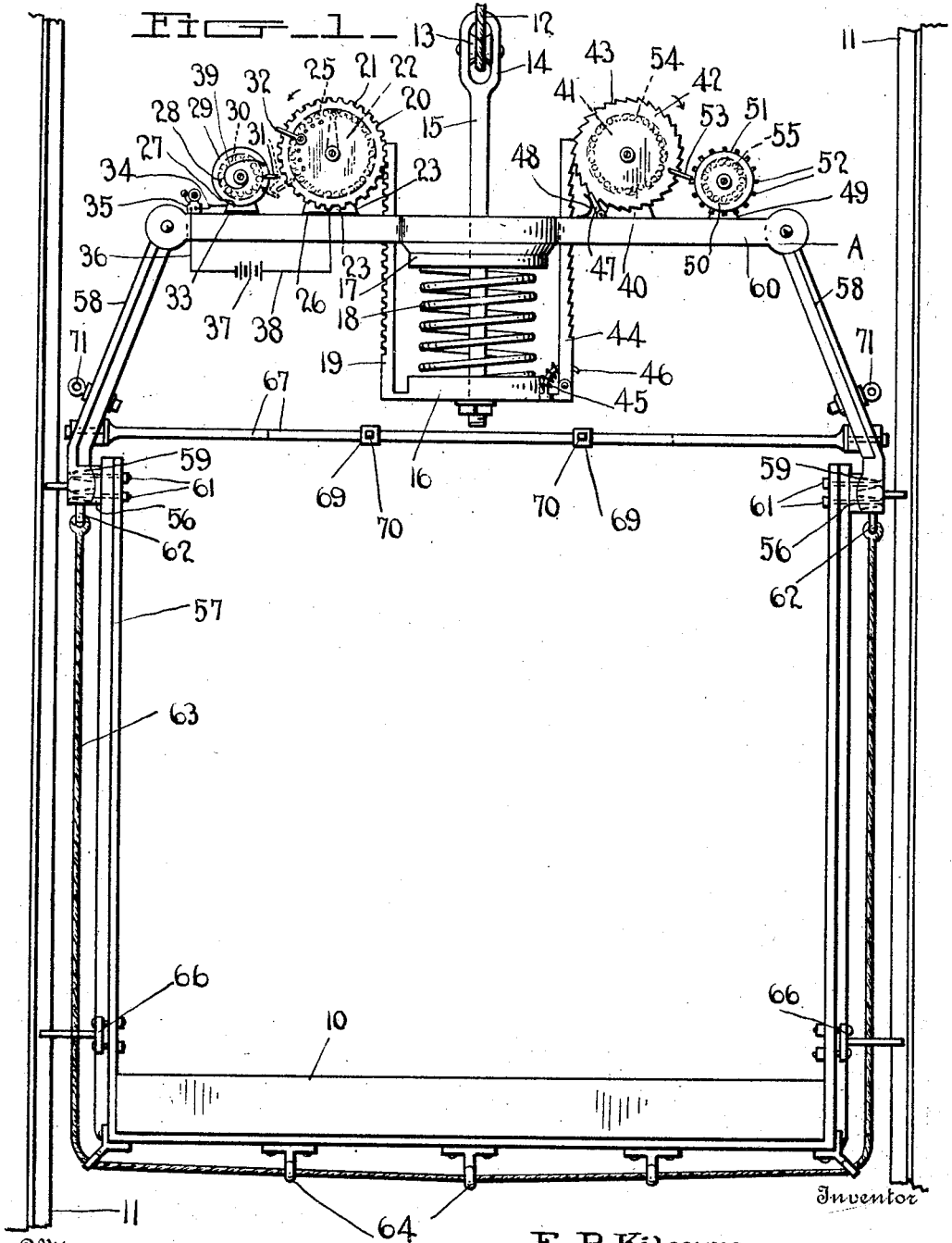
Witnesses
L. B. James
L. N. Gillis
Inventor
E. P. Kilcoyne
By Charles Chandler
Attorneys

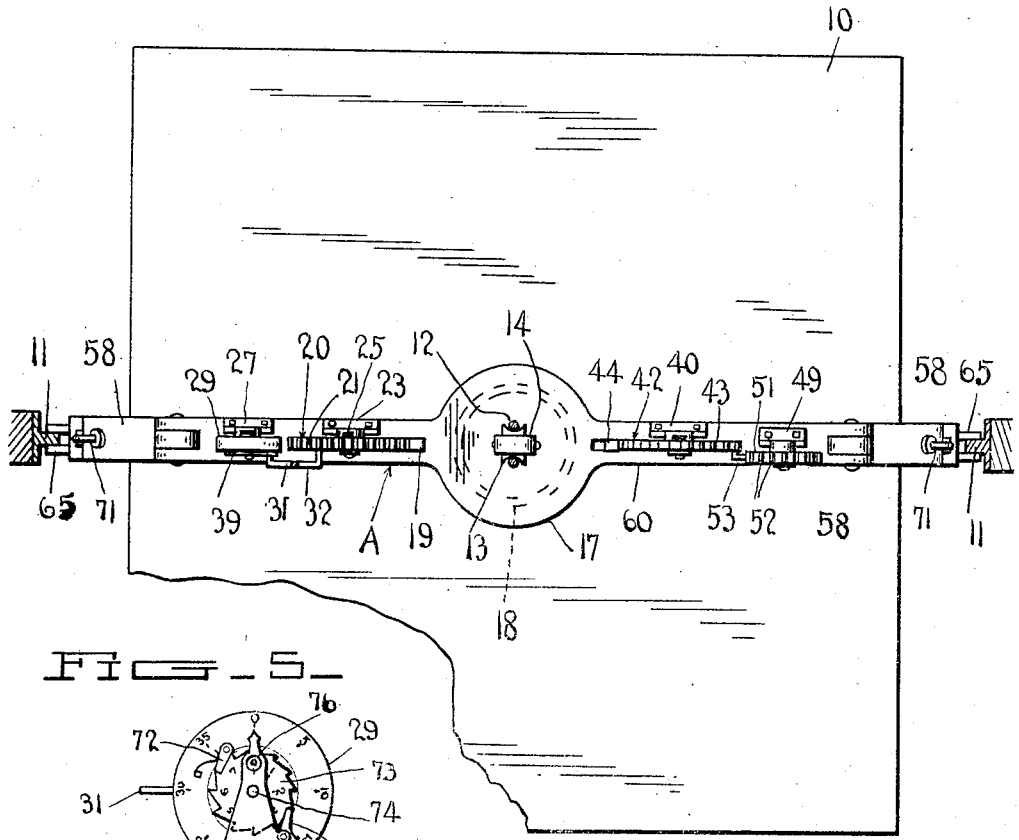

E. P. KILCOYNE.
WEIGHING DEVICE FOR ELEVATORS.
APPLICATION FILED JULY 2, 1910.
1,003,913.
Patented Sept. 19, 1911.
3 SHEETS—SHEET 3.
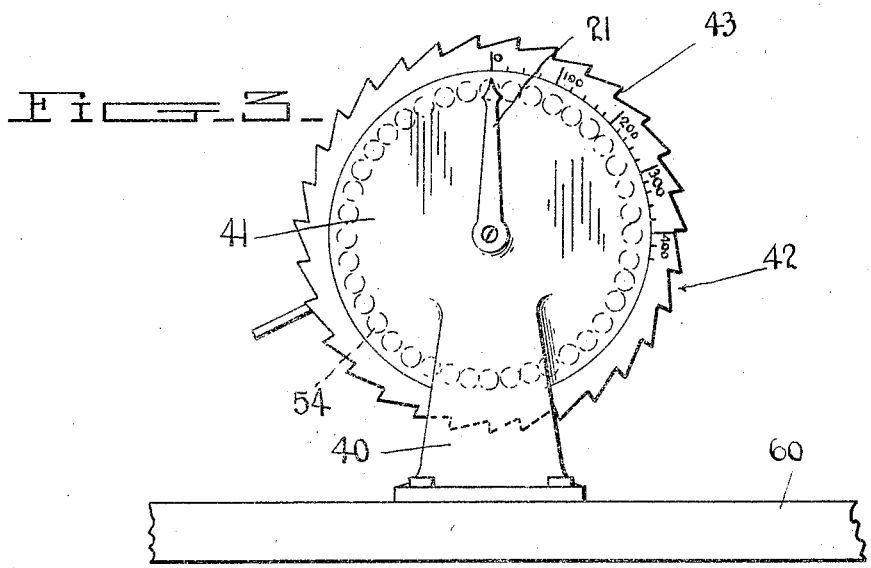
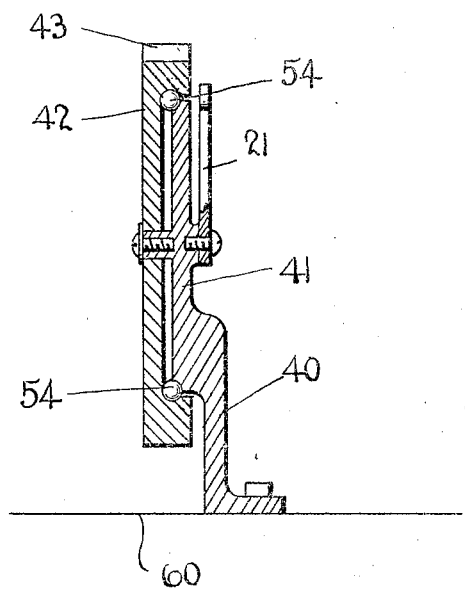
Witnesses
L. B. James
L. N. Gillis
Inventor
E. P. Kilcoyne
By Chandler & Chandler
Attorneys

UNITED STATES PATENT OFFICE.

EARL P. KILCOYNE, OF CAIRO, ILLINOIS.

WEIGHING DEVICE FOR ELEVATORS.

1,003,913.  Specification of Letters Patent.  Patented Sept. 19, 1911.

Application filed July 2, 1910. Serial No. 570,167.

*To all whom it may concern:*

Be it known that I, EARL P. KILCOYNE, a citizen of the United States, residing at Cairo, in the county of Alexander, State of Illinois, have invented certain new and useful Improvements in Weighing Devices for Elevators; and I do hereby declare the following to be a full, clear, and exact description of the invention, such as will enable others skilled in the art to which it appertains to make and use the same.

This invention relates to elevators such as are used to carry weights of various kinds up in buildings and it has special reference to a weighing device which indicates the amount of weight placed upon the elevator.

One object of the invention is to provide means connected directly to the elevator to weigh the load placed thereon.

A second object of the invention is to provide a novel arrangement for indicating when the elevator is overloaded.

A third object of the invention is to provide novel means for indicating the extent of the overload.

A fourth object of the invention is to provide a totaling device which will indicate the total of the loads carried by the elevator during any desired period, the device being capable of being reset at the end of the period.

With the above and other objects in view, the invention consists in general of an elevator provided with a novel and improved appliance, the appliance being used for registering weights on the elevator and recording the totals thereof.

The invention further consists in certain novel details of construction and combinations of parts hereinafter fully described, illustrated in the accompanying drawings, and specifically set forth in the claims.

In the accompanying drawings, like characters of reference indicate like parts in the several views.

Figure 1 is a view from the rear of an elevator provided with this invention, the view being taken from this side, the better to disclose certain of the details thereof.
Fig. 2 is a top plan view of the elevator. Fig. 3 is a front view of one of the dials and the parts connected thereto. Fig. 4 is a section through such a dial. Fig. 5 is a detail view showing a mechanism used in connec-
tion with the overload indicator, the mechanism showing the number of times the device has been overloaded.

The elevator car itself is indicated at 10 and this car is carried in the usual well which is provided with guides, sections of which are shown at 11. Attached to this car is an adjustable frame indicated in general at A. The details and manner of adjusting this frame will be hereinafter described.

At 12 is the usual hoisting rope which is preferably doubled and run over a shaft 13 carried in an eye 14 formed at the upper end of a bar 15 which passes downward through the upper member of the frame and carries on its lower end a spring seat 16. The eye 14 is provided so that in the event of the shaft 13 giving away the rope will not allow the elevator to fall but will be caught by said eye. Carried on the upper member of the frame and immediately above the spring seat 16 is a second spring seat 17 and between these two spring seats is a heavy coil spring 18 arranged to compress when the load is placed upon the elevator. At one side of the spring seat 16 is secured a rack bar 19 which meshes with an annular dial 20 having peripheral teeth 21. This dial 20 is provided with any suitable divisions and inside of the dial is a center 22 supported on a bracket 23 carried on the frame A. Between the center 22 and the dial 20 are a series of anti-friction balls 24 so arranged that they permit the easy movement of the annular dial over its center. On the front side of this dial is a pointer or index 25 which normally stands opposite the zero of the graduations. Between the bracket 23 and the frame A is insulation 26. At 27 is a similar insulated bracket carrying a similar center 28 around which moves a dial 29 carried, like the dial 20, on balls 30. Extending out from the rear of the dial 29 is an arm 31 while extending from the dial 20 is a similar arm 32. The bracket 27 is supported on insulation 33 and to this bracket is connected a wire 34 leading to a bell 35 which is in turn connected by a wire 36 to a battery 37 or other suitable source of electrical supply. The other terminal of the battery 37 is connected by a wire 38 to the bracket 23. The dial 29 is normally kept with the arm 31 in the position shown in full lines in Fig. 1 by means of a spring 39 which has one end connected to the center 28 and the other to the ring 29. This dial and its parts form the overload dial.

Now when weight is placed upon the elevator the spring 18 will be compressed and the frame A drawn down with reference to the spring seat 16. This will cause the dial 20 to rotate through its engagement with the rack 19. When the rotation has progressed to such a degree that the arm 32 contacts with the arm 31 a circuit will be established through the bell and an alarm be rung. If more material be placed upon the elevator the dial 29 will be rotated and show the extent of the overload. When the weight is removed from the elevator the dial 20 will be returned to its original position by the action of the rack 19 while the spring 39 will in like manner return the dial 29 to its original position.

The totaling mechanism comprises a bracket 40 which is supported on the frame and carries a center 41 around which moves a dial 42 of annular shape and provided with ratchet teeth which mesh with the ratchet teeth 43. This ratchet bar is normally held in engagement with the teeth 43 by a spring 45 carried on a curved guide 46. In order to prevent backward movement of the dial 42 a pawl 47 is provided which is pivoted adjacent said dial and which is held against the dial by a spring 48.

At 49 is a second bracket which supports a center 50 around which moves an annular dial 51. Extending outward from this annular dial are a series of teeth 52 and carried by the dial 42 is a single tooth or pin 53. In the operation of this portion of the invention, whenever the spring 18 is compressed the ratchet bar 44 causes the dial 42 to rotate. When the spring 18 expands upon removal of the load the spring 45 yields and permits the ratchet bar to move over the teeth 43, the dial being at this time held stationary by the pawl 47. With each complete revolution of the dial 42 the tooth 53 contacts with one of the teeth 52 and rotates the dial 51 to the extent of one tooth. In order to eliminate friction between the last two dials and their centers the center 41 is surrounded by balls 54 while the center 50 is surrounded by similar balls 55.

The attaching means whereby the device is carried on the elevator is indicated in general at A.

From the foregoing it will be observed that the load placed on the elevator actuates the weighing mechanism and that when an overload is placed thereon an alarm is given and the extent of overload indicated. Furthermore, from the operation of the ratchet provided device it will be plain that the accumulated loads may be indicated. Whenever it is desired to reset the latter it is done by simply depressing the spring pawl and rotating the dial until the zero mark is brought opposite the pointer carried on the center.

For the purpose of indicating the number of times that the elevator has been overloaded there is provided on the dial 29 a spring pressed pawl 72 which engages with a ratchet 73 mounted to rotate on a pin 74 supported on the frame 27. Furthermore, the frame 27 is provided with a checking pawl 75 likewise spring pressed. This portion of the invention is so arranged that as the overload indicator is rotated in the manner previously described the ratchet 73 will be rotated by the pawl 72 but when the spring 39 returns the dial 29 to its original position the pawl 72 will move over the teeth of the ratchet while the pawl 75 will prevent its return. The ratchet is provided with indicator numbers and is so proportioned that each time the elevator is overloaded one of these numbers will be displayed through a suitable opening 76 forming an index, it being observed that an arrow head or the like may be used as an index in place of this opening.

There has thus been provided a simple and efficient device of the kind described and for the purpose specified.

It is obvious that minor changes may be made in the form and construction of this invention without departing from the material principles thereof. It is not therefore desired to confine the invention to the exact form herein shown and described, but it is wished to include all such as properly come within the scope of the appended claims.

Having thus described the invention, what is claimed as new, is:—

1. The combination with an elevator, of a lifting cable therefor, a weight indicating mechanism disposed between and operatively connected to the lifting cable and elevator, and an overload indicator controlled by said weight indicating mechanism.

2. The combination with an elevator, of a lifting cable therefor, a weight indicating mechanism disposed between and operatively connected to the lifting cable and elevator, an overload indicator controlled by said weight indicating mechanism, and a register controlled by the overload indicator.

3. In combination with an elevator car; a weight indicating mechanism carried by said car, resilient suspension means for said car, an operative connection between said suspension means and weight indicating mechanism, and an overload indicator controlled by said weight indicating mechanism, said overload indicator including an alarm and means to indicate the extent of overload.

4. In combination with an elevator car; a frame supporting said car, a hoisting cable, a spring seat carried by said cable, and a spring between said spring seat and frame; a weight indicating mechanism carried by said car, and an operative connection between said spring seat and weight indicating mechanism.

5. In combination with an elevator car; a frame supporting said car, a hoisting cable, a spring seat carried by said cable, and a spring between said spring seat and frame; a weight indicating mechanism carried by said car, a totaling mechanism carried by said car, and operative connections between the spring seat and the weight indicating and totaling mechanisms.

6. In combination with an elevator car; a frame supporting said car, a hoisting cable, a spring seat carried by said cable, and a spring between said spring seat and frame, a weight indicating mechanism carried by said car, an operative connection between said suspension means and weight indicating mechanism, and an overload indicator controlled by said weighing mechanism.

7. In combination with an elevator car; a frame supporting said car, a hoisting cable, a spring seat carried by said cable, and a spring between said spring seat and frame; a weight indicating mechanism carried by said car, a totaling mechanism carried by said car, an operative connection between said spring seat and the weight indicating and totaling mechanisms, and an overload indicator controlled by said weight indicating mechanism.

8. In combination with an elevator car; a frame supporting said car, a hoisting cable, a spring seat carried by said cable, and a spring between said spring seat and frame; a weight indicating mechanism carried by said car, an operative connection between said suspension means and weighing mechanism, and an overload indicator controlled by said weighing mechanism and including an alarm and means to indicate the extent of overload.

9. In combination with an elevator car; a frame supporting said car, a hoisting cable, a spring seat carried by said cable, and a spring between said spring seat and frame; a weight indicating mechanism carried by said car, a totaling mechanism carried by said car, an operative connection between said spring seat and the weight indicating and totaling mechanisms, and an overload indicator controlled by said weight indicating mechanism and including an alarm and means to indicate the extent of overload.

10. In combination with an elevator car, a frame supporting said car, a hoisting cable, a spring seat carried by said cable, and a spring between said spring seat and frame; a rotary dial provided with peripheral teeth, a rack carried by said spring seat and meshing with said dial, a stationary center carrying said dial and connected to said frame, and an index on said center.

11. In combination with an elevator car; a frame supporting said car, a hoisting cable, a spring seat carried by said cable, and a spring between said spring seat and frame; a rotary dial provided with peripheral teeth, a rack carried by said spring seat and meshing with said dial, a stationary center carrying said dial and connected to said frame, a pointer on said center, an overload indicator, and means to operate said overload indicator.

12. In combination with an elevator car, a frame supporting said car, a hoisting cable, a spring seat carried by said cable, and a spring between said spring seat and frame; a rotary ring, a stationary center for said ring connected to said frame, ratchet teeth formed around the periphery of said ring, a bar pivoted to the spring seat and provided with ratchet teeth, a spring urging the bar against said ring, and a pawl pivoted adjacent to and engaging with said teeth.

13. In combination with an elevator car, a frame supporting said car, a hoisting cable, a spring seat carried by said cable, and a spring between said spring seat and frame; a rotary ring, a stationary center for said ring connected to said frame, ratchet teeth formed around the periphery of said ring, a ratchet bar pivoted to the spring seat, a spring urging said ratchet bar against said ring, a pawl pivoted to and engaging with said teeth, a dial adjacent said ring, a dial center carried by said frame, an index on said center, a series of spaced teeth projecting from said dial, and a pin carried by said ring to move the dial a distance of one tooth for each revolution of the ring.

In testimony whereof, I affix my signature, in presence of two witnesses.

EARL P. KILCOYNE.

Witnesses:
ELLIS E. COX,
ROWENA C. STACK.